United States Patent
Taherzadeh Boroujeni et al.

(10) Patent No.: US 11,652,528 B2
(45) Date of Patent: May 16, 2023

(54) TECHNIQUES FOR INDICATING SELECTION OF CHANNEL STATE INFORMATION (CSI) REPORT SETTING OPTION BY A DEMODULATION REFERENCE SIGNAL (DMRS) PATTERN

(71) Applicant: QUALCOMM Incorporated, San Diego, CA (US)

(72) Inventors: Mahmoud Taherzadeh Boroujeni, San Diego, CA (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/236,595

(22) Filed: Apr. 21, 2021

(65) Prior Publication Data
US 2021/0336675 A1   Oct. 28, 2021

Related U.S. Application Data

(60) Provisional application No. 63/016,842, filed on Apr. 28, 2020.

(51) Int. Cl.
*H04B 7/06* (2006.01)
*H04W 72/08* (2009.01)
(Continued)

(52) U.S. Cl.
CPC ......... *H04B 7/0626* (2013.01); *H04L 5/0051* (2013.01); *H04W 72/042* (2013.01); *H04W 72/085* (2013.01)

(58) Field of Classification Search
CPC .. H04B 7/0626; H04L 5/0051; H04W 72/042; H04W 72/085
(Continued)

(56) References Cited

U.S. PATENT DOCUMENTS

2015/0373694 A1* 12/2015 You .................... H04W 24/08
370/329
2018/0295637 A1   10/2018 Manolakos et al.
(Continued)

OTHER PUBLICATIONS

International Search Report and Written Opinion—PCT/US2021/028643—ISA/EPO—dated Jul. 19, 2021.
(Continued)

*Primary Examiner* — Rownak Islam
(74) *Attorney, Agent, or Firm* — Arent Fox, LLP

(57) ABSTRACT

The present disclosure relates to selections of a channel state information (CSI) report setting option by a distinct demodulation reference signal (DMRS) pattern. Specifically, in one aspect, a user equipment (UE) may determine a CSI transmission setting based on the at least one measurement of the communication channel, the CSI transmission setting is associated with a distinct DMRS pattern, and transmit a CSI report with the distinct DMRS pattern to the network entity in accordance with the CSI transmission setting. In another aspect, a network entity may transmit CSI setting configuration information to a UE, the CSI setting configuration information including at least one parameter corresponding to a channel measurement threshold that triggers selection of a distinct DMRS pattern based on a CSI transmission setting, and receive a CSI report and the distinct DMRS pattern from the UE associated with the CSI transmission setting.

28 Claims, 7 Drawing Sheets

| CSI report number | CSI fields |
|---|---|
| CSI report #n | CRI or SSBRI #1, if reported |
|  | CRI or SSBRI #2, if reported |
|  | CRI or SSBRI #3, if reported |
|  | CRI or SSBRI #4, if reported |
|  | SINR #1, if reported |
|  | Differential SINR #2, if reported |
|  | Differential SINR #3, if reported |
|  | Differential SINR #4, if reported |

(51) Int. Cl.
 *H04W 72/04* (2023.01)
 *H04L 5/00* (2006.01)
(58) Field of Classification Search
 USPC .......................................................... 370/329
 See application file for complete search history.

(56) References Cited

U.S. PATENT DOCUMENTS

| | | | |
|---|---|---|---|
| 2019/0044679 A1 | 2/2019 | Manolakos et al. | |
| 2019/0268089 A1* | 8/2019 | Fu ....................... | H04W 72/042 |
| 2020/0052861 A1* | 2/2020 | Li ...................... | H04W 72/0413 |
| 2020/0178279 A1* | 6/2020 | Frenne .............. | H04W 72/1289 |

OTHER PUBLICATIONS

ZTE, et al., "Remaining Details on CSI Measurement", 3GPP TSG RAN WG1 Meeting #90bis, 3GPP Draft, R1-1717422, vol. RAN WG1, No. Prague, Czech Republic, Oct. 9, 2017-Oct. 13, 2017, Oct. 3, 2017 (Oct. 3, 2017), 6 Pages, XP051352640, Retrieved from the Internet: URL: http://www.3gpp.org/ftp/tsg_ran/WG1_RL1/TSGR1_90b/Docs/ [retrieved on Oct. 3, 2017] Sections 1-5.

* cited by examiner

| CSI report number | CSI fields |
|---|---|
| CSI report #n | CRI or SSBRI #1, if reported |
| | CRI or SSBRI #2, if reported |
| | CRI or SSBRI #3, if reported |
| | CRI or SSBRI #4, if reported |
| | SINR #1, if reported |
| | Differential SINR #2, if reported |
| | Differential SINR #3, if reported |
| | Differential SINR #4, if reported |

FIG. 4

TECHNIQUES FOR INDICATING SELECTION OF CHANNEL STATE INFORMATION (CSI) REPORT SETTING OPTION BY A DEMODULATION REFERENCE SIGNAL (DMRS) PATTERN

CROSS-REFERENCE TO RELATED APPLICATION(S)

This application claims the benefit of U.S. Provisional Patent Application No. 63/016,842, entitled "TECHNIQUES FOR INDICATING SELECTION OF CHANNEL STATE INFORMATION (CSI) REPORT SETTING OPTION BY A DEMODULATION REFERENCE SIGNAL (DMRS) PATTERN" and filed on Apr. 28, 2020, which is expressly incorporated by reference herein in its entirety.

BACKGROUND

Aspects of the present disclosure relate generally to wireless communication systems, and more particularly, to indicating selection of a channel state information (CSI) report setting option by a demodulation reference signal (DMRS) pattern.

Wireless communication systems are widely deployed to provide various types of communication content such as voice, video, packet data, messaging, broadcast, and so on. These systems may be multiple-access systems capable of supporting communication with multiple users by sharing the available system resources (such as time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In some aspects, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications (mMTC), which can allow a very large number of connected devices and transmission of a relatively low volume of non-delay-sensitive information.

For example, for various communications technology such as, but not limited to NR, some aspects may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of wireless communication at a user equipment (UE) including obtaining at least one measurement of a communication channel associated with a network entity, determining a channel state information (CSI) transmission setting based on the at least one measurement of the communication channel, wherein the CSI transmission setting is associated with a distinct demodulation reference signal (DMRS) pattern, and transmitting a CSI report with the distinct DMRS pattern to the network entity in accordance with the CSI transmission setting.

Another aspect of the subject matter described in this disclosure can be implemented in an apparatus for wireless communication. The apparatus may include memory and a processor in communication with the memory. The processor may be configured to obtain at least one measurement of a communication channel associated with a network entity. The processor may further be configured to determine a CSI transmission setting based on the at least one measurement of the communication channel, wherein the CSI transmission setting is associated with a distinct DMRS pattern. The processor may further be configured to transmit a CSI report with the distinct DMRS pattern to the network entity in accordance with the CSI transmission setting.

A further aspect of the subject matter described in this disclosure can be implemented in an apparatus for wireless communication. The apparatus may include means for obtaining at least one measurement of a communication channel associated with a network entity. The means for determining a CSI transmission setting based on the at least one measurement of the communication channel, wherein the CSI transmission setting is associated with a distinct DMRS pattern. The means for transmitting a CSI report with the distinct DMRS pattern to the network entity in accordance with the CSI transmission setting.

Another aspect of the subject matter described in this disclosure can be implemented in a non-transitory computer-readable medium computer-readable medium including stored instructions of communications, executable by a processor to obtain at least one measurement of a communication channel associated with a network entity, determine a CSI transmission setting based on the at least one measurement of the communication channel, wherein the CSI transmission setting is associated with a distinct DMRS pattern, and transmit a CSI report with the distinct DMRS pattern to the network entity in accordance with the CSI transmission setting.

Another example aspect includes method of wireless communication at a network entity including transmitting CSI setting configuration information to a UE, the CSI setting configuration information including at least one parameter corresponding to a channel measurement threshold that triggers selection of a distinct DMRS pattern based on a CSI transmission setting, and receiving a CSI report with the distinct DMRS pattern from the UE associated with the CSI transmission setting.

Another aspect of the subject matter described in this disclosure can be implemented in an apparatus for wireless communication. The apparatus may include memory and a processor in communication with the memory. The processor may be configured to transmit CSI setting configuration information to a UE, the CSI setting configuration information including at least one parameter corresponding to a channel measurement threshold that triggers selection of a distinct DMRS pattern based on a CSI transmission setting. The processor may further be configured to receive a CSI report with the distinct DMRS pattern from the UE associated with the CSI transmission setting.

A further aspect of the subject matter described in this disclosure can be implemented in an apparatus for wireless communication. The apparatus may include means for transmitting CSI setting configuration information to a UE, the CSI setting configuration information including at least one parameter corresponding to a channel measurement threshold that triggers selection of a distinct DMRS pattern based on a CSI transmission setting. The apparatus means for receiving a CSI report with the distinct DMRS pattern from the UE associated with the CSI transmission setting.

Another aspect of the subject matter described in this disclosure can be implemented in a non-transitory computer-readable medium computer-readable medium including stored instructions of communications, executable by a processor to transmit CSI setting configuration information to a UE, the CSI setting configuration information including at least one parameter corresponding to a channel measurement threshold that triggers selection of a distinct DMRS pattern based on a CSI transmission setting, and receive a CSI report with the distinct DMRS pattern from the UE associated with the CSI transmission setting.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is an example representation of a channel state information (CSI) report.

Like reference numbers and designations in the various drawings indicate like elements.

DETAILED DESCRIPTION

Figure 1:
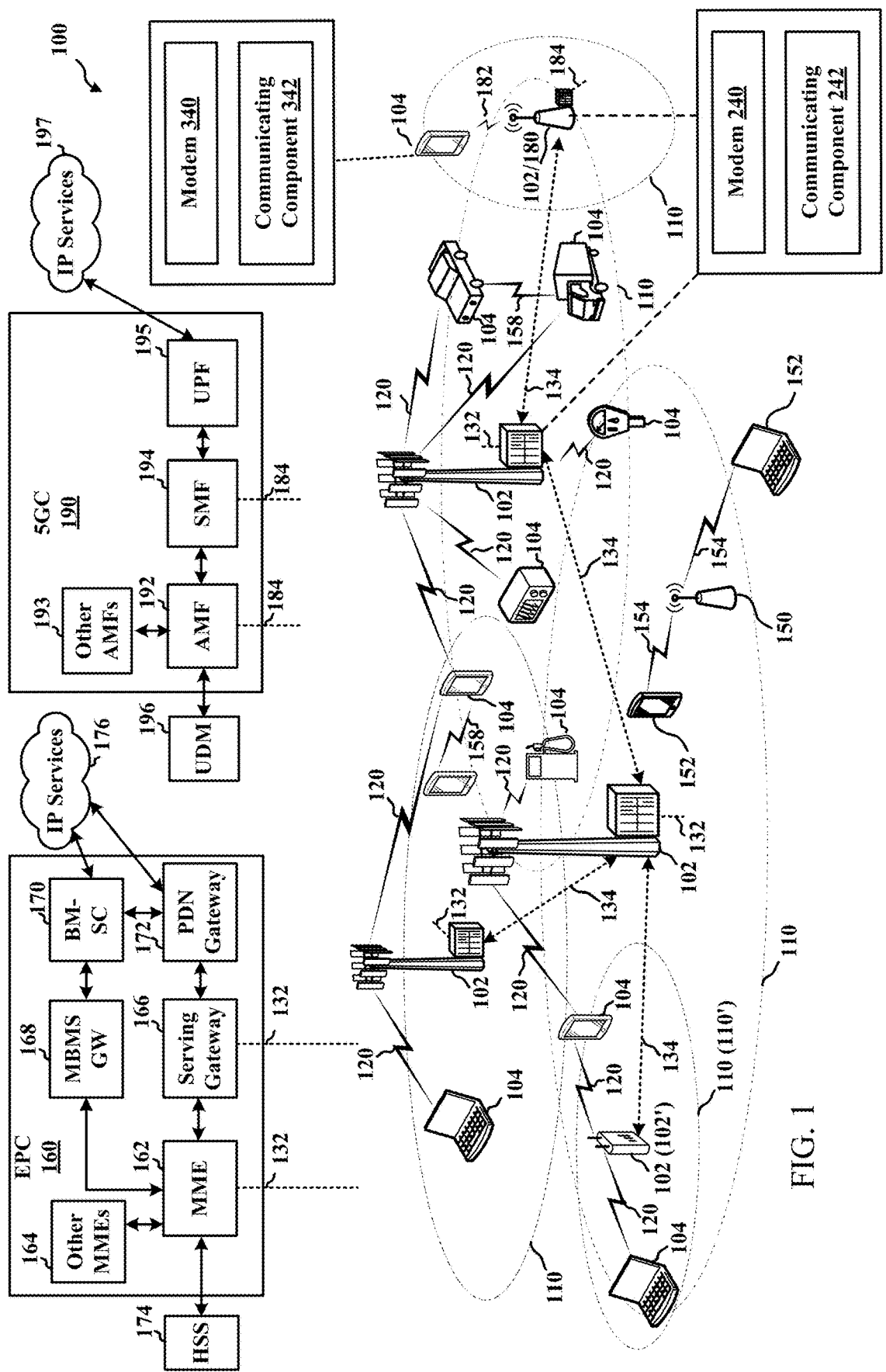
FIG. 1 illustrates an example of a wireless communication system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to indicating selection of a channel state information (CSI) report setting option by a demodulation reference signal (DMRS) pattern. Specifically, the present disclosure includes a method, apparatus, and non-statutory computer readable medium for wireless communications at a user equipment (UE) including obtaining at least one measurement of a communication channel associated with a network entity, such as a downlink reception quality indicator, a reference signal received power (RSRP), or a signal-to-interference noise ratio (SINR). The aspects may further include determining a CSI transmission setting corresponding to one of a repetitious CSI transmission setting or a non-repetitious CSI transmission setting based on the at least one measurement of the communication channel, the CSI transmission setting is associated with a distinct DMRS pattern, and transmitting a CSI report with the distinct DMRS pattern to the network entity in accordance with the CSI transmission setting.

The present disclosure further includes a method, apparatus, and non-statutory computer readable medium for wireless communications at a network entity including transmitting CSI setting configuration information to a UE, the CSI setting configuration information including at least one parameter corresponding to a channel measurement threshold that triggers selection of a distinct DMRS pattern based on a CSI transmission setting, and receiving a CSI report with the distinct DMRS pattern from the UE associated with the CSI transmission setting.

Particular implementations of the subject matter described in this disclosure can be implemented to realize one or more of the following potential advantages. For example, coverage of CSI report transmissions may be improved by indicating a selection of a CSI report setting option based on a DMRS pattern. As a result, the reliability of beam management for unicast channels may be increased.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, or a computer. By way of illustration, both an application running on a computing device and the computing device can be a component. One or more components can reside within a process or thread of execution and a component can be localized on one computer or distributed between two or more computers. In addition, these components can execute from various computer readable media having various data structures stored thereon. The components can communicate by way of local or remote processes such as in accordance with a signal having one or more data packets, such as data from one component interacting with another component in a local system, distributed system, or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (such as LTE) communications over a shared radio frequency spectrum band. The description below, however, describes an LTE/LTE-A system for purposes of example, and LTE terminology is used in much of the description below, although the techniques are applicable beyond LTE/LTE-A applications (such as to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. or may not include all of the devices, components, modules etc. discussed in connection with the figures. A combination of these approaches also can be used.

FIG. 1 illustrates an example of a wireless communication system. The wireless communications system (also referred to as a wireless wide area network (WWAN)), includes an access network 100, base stations 102, UEs 104, an Evolved Packet Core (EPC) 160, or a 5G Core (5GC) 190. The base stations 102, which also may be referred to as network entities, may include macro cells (high power cellular base station) or small cells (low power cellular base station). The macro cells can include base stations. The small cells can include femtocells, picocells, and microcells. In an example, the base stations 102 also may include gNBs 180, as described further herein.

In one example, some nodes such as base station 102/gNB 180, may have a modem 240 and communicating component 242 for determining and transmitting CSI setting configuration information to a UE and receiving a CSI report along with a distinct DMRS pattern indicating a repetitious or non-repetitious CSI report transmission setting, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for indicating selection of a CSI report setting option (i.e., repetitious or non-repetitious CSI report transmission setting) by a distinct DMRS pattern, as described herein. Though a UE 104 is shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (such as using an Si interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or 5GC 190) with each other over backhaul links 134 (such as using an X2 interface). The backhaul links 132, 134 or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network also may include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (such as for x component carriers) used for transmission in the DL or the UL direction. The carriers may or may not be adjacent to each other. Allocation of carriers may be asymmetric with respect to DL and UL (such as more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, which may correspond to gNB 180, may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (such as from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (such as satellite, terrestrial), a multimedia device, a video device, a digital audio player (such as MP3 player), a camera, a game console, a tablet, a smart device, robots, drones, an industrial/manufacturing device, a wearable device (such as a smart watch, smart clothing, smart glasses, virtual reality goggles, a smart wristband, smart jewelry (such as a smart ring, a smart bracelet)), a vehicle/a vehicular device, a meter (such as parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (such as meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 5:
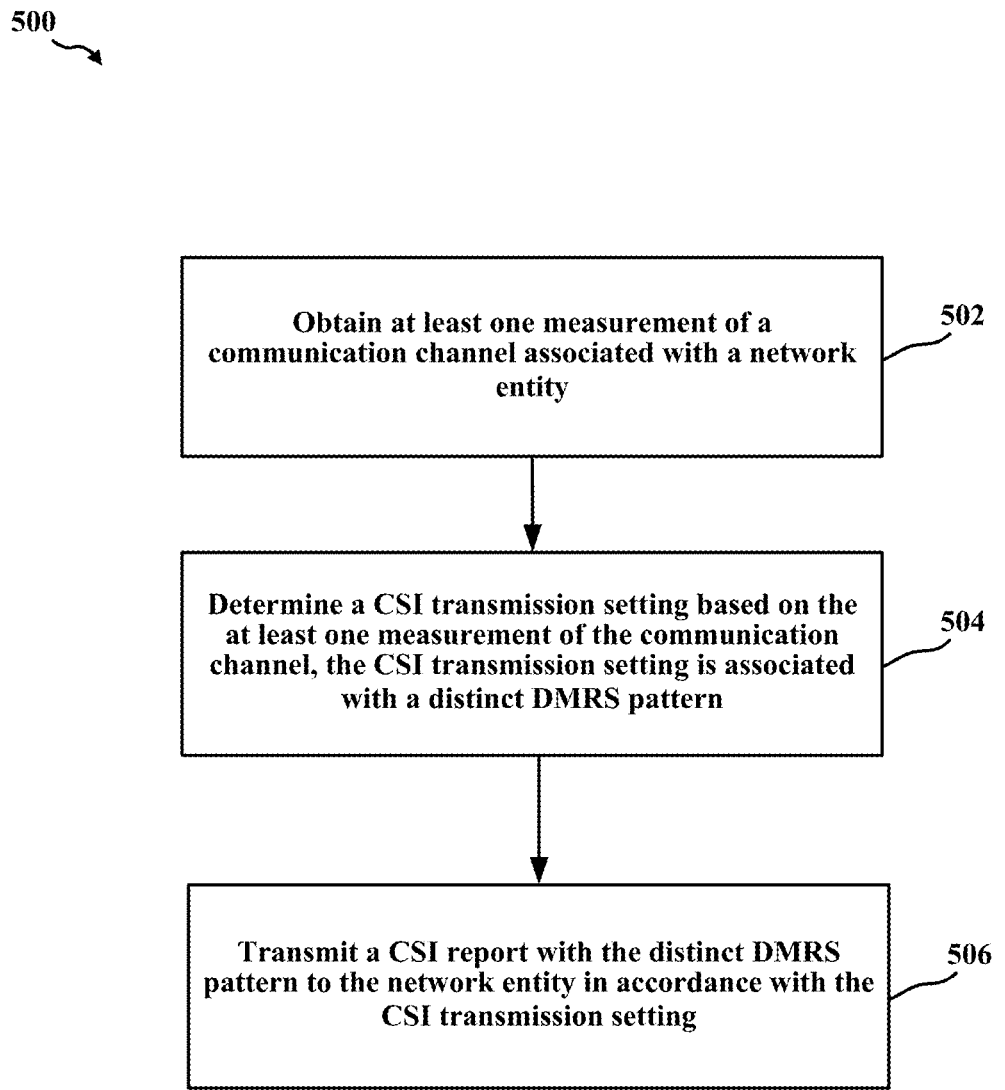
FIG. 5 is a flowchart of an example method of wireless communication at a UE.
Figure 6:
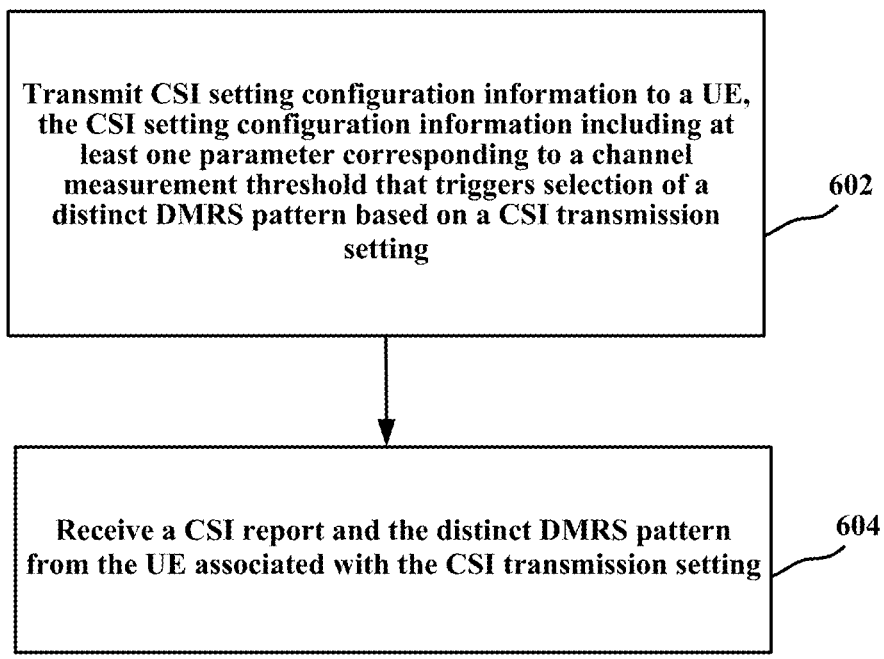
FIG. 6 is a flowchart of an example method of wireless communication at a network entity.

Turning now to FIGS. 2-7, aspects are depicted with reference to one or more components and one or more methods that may perform the actions or operations described herein, where aspects in dashed line may be optional. Although the operations described below in FIGS. 5 and 6 are presented in a particular order or as being performed by an example component, it should be understood that the ordering of the actions and the components performing the actions may be varied, depending on the aspect. Moreover, it should be understood that the following actions, functions, or described components may be performed by a specially-programmed processor, a processor executing specially-programmed software or computer-readable media, or by any other combination of a hardware component or a software component capable of performing the described actions or functions.

Figure 2:
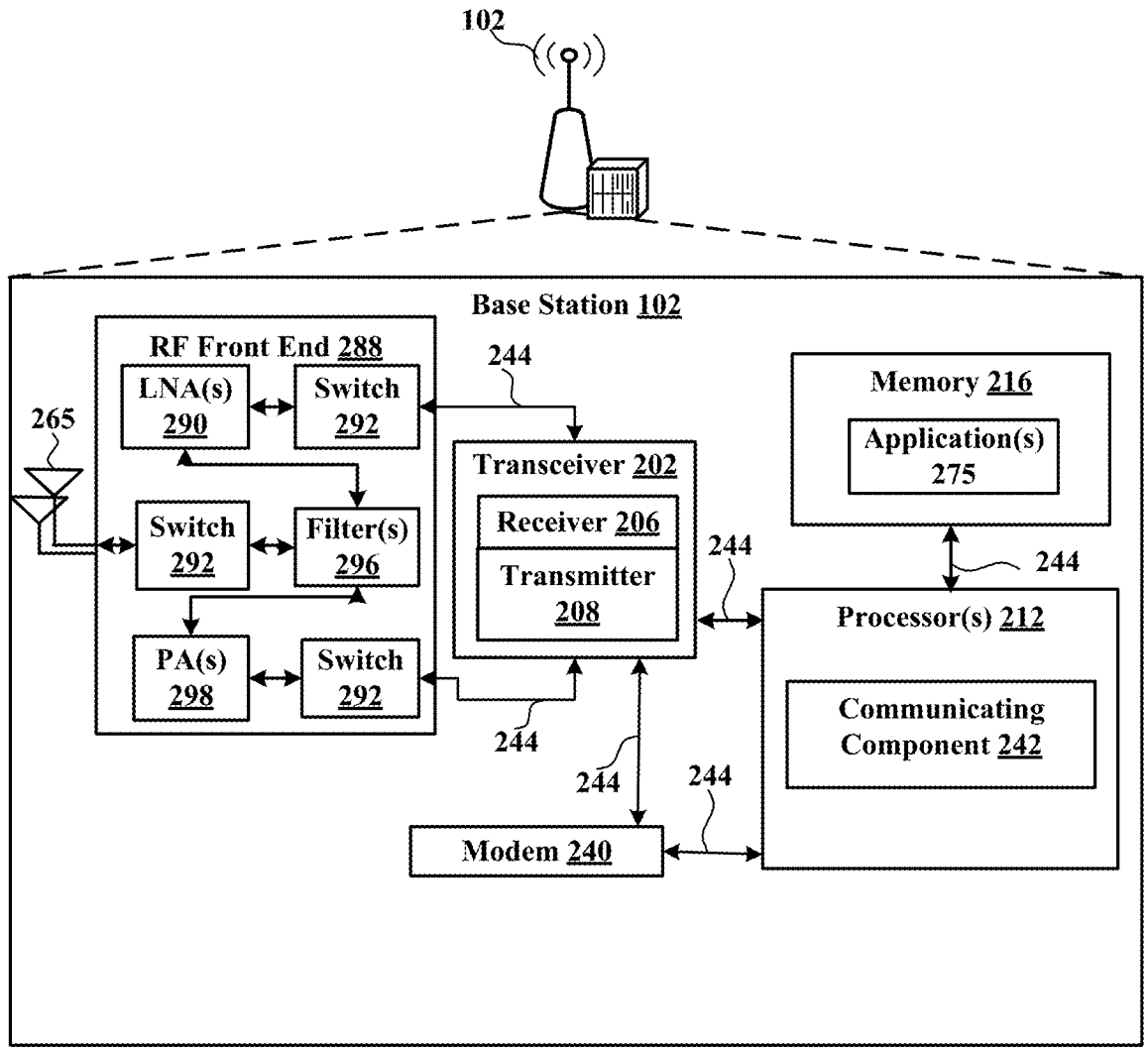
FIG. 2 is a block diagram illustrating an example of a network entity (also referred to as a base station).

FIG. 2 is a block diagram illustrating an example of a network entity (also referred to as a base station). The base station 102 (such as a base station 102 or gNB 180, as described above) may include a variety of components, some of which have already been described above and are described further herein, including components such as one or more processors 212 and memory 216 and transceiver 202 in communication via one or more buses 244, which may operate in conjunction with modem 240 or communicating component 242 for determining and transmitting CSI setting configuration information to a UE and receiving a CSI report along with a distinct DMRS pattern indicating a repetitious or non-repetitious CSI report transmission setting.

In some aspects, the one or more processors 212 can include a modem 240 or can be part of the modem 240 that uses one or more modem processors. Thus, the various functions related to communicating component 242 may be included in modem 240 or processors 212 and, in some aspects, can be executed by a single processor, while in other aspects, different ones of the functions may be executed by a combination of two or more different processors. For example, in some aspects, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 or modem 240 associated with communicating component 242 may be performed by transceiver 202.

Also, memory 216 may be configured to store data used herein or local versions of applications 275 or communicating component 242 or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In some aspects, for example, memory 216 may be a non-transitory computer-readable storage medium that stores one or more computer-executable codes defining communicating component 242 or one or more of its subcomponents, or data associated therewith, when base station 102 is operating at least one processor 212 to execute communicating component 242 or one or more of its subcomponents.

Transceiver 202 may include at least one receiver 206 and at least one transmitter 208. Receiver 206 may include hardware or software executable by a processor for receiving data, the code including instructions and being stored in a memory (such as computer-readable medium). Receiver 206 may be, for example, a radio frequency (RF) receiver. In some aspects, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware or software executable by a processor for transmitting data, the code including instructions and being stored in a memory (such as computer-readable medium). A suitable example of transmitter 208 may including, but is not limited to, an RF transmitter.

Moreover, in some aspects, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, or antenna arrays.

In some aspects, LNA 290 can amplify a received signal at a desired output level. In some aspects, each LNA 290 may have a specified minimum and maximum gain values. In some aspects, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In some aspects, each PA 298 may have specified minimum and maximum gain values. In some aspects, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in some aspects, for example, a respective filter 296 can be used to filter an output from a respective PA 298 to produce an output signal for transmission. In some aspects, each filter 296 can be connected to a specific LNA 290 or PA 298. In some aspects, RF front end 288 can use one or more switches 292 to select a transmit or receive path using a specified filter 296, LNA 290, or PA 298, based on a configuration as specified by transceiver 202 or processor 212.

As such, transceiver 202 may be configured to transmit and receive wireless signals through one or more antennas 265 via RF front end 288. In some aspects, transceiver may be tuned to operate at specified frequencies such that UE 104 can communicate with, for example, one or more base stations 102 or one or more cells associated with one or more base stations 102. In some aspects, for example, modem 240 can configure transceiver 202 to operate at a specified frequency and power level based on the UE configuration of the UE 104 and the communication protocol used by modem 240.

In some aspects, modem 240 can be a multiband-multimode modem, which can process digital data and communicate with transceiver 202 such that the digital data is sent and received using transceiver 202. In some aspects, modem 240 can be multiband and be configured to support multiple frequency bands for a specific communications protocol. In some aspects, modem 240 can be multimode and be configured to support multiple operating networks and communications protocols. In some aspects, modem 240 can control one or more components of UE 104 (such as RF front end 288, transceiver 202) to enable transmission or reception of signals from the network based on a specified modem configuration. In some aspects, the modem configuration can be based on the mode of the modem and the frequency band in use. In another aspect, the modem configuration can be based on UE configuration information associated with UE 104 as provided by the network during cell selection or cell reselection.

In some aspects, the processor(s) 212 may correspond to one or more of the processors described in connection with the UE in FIGS. 4 and 6. Similarly, the memory 216 may correspond to the memory described in connection with the UE in FIG. 7.

Figure 3:
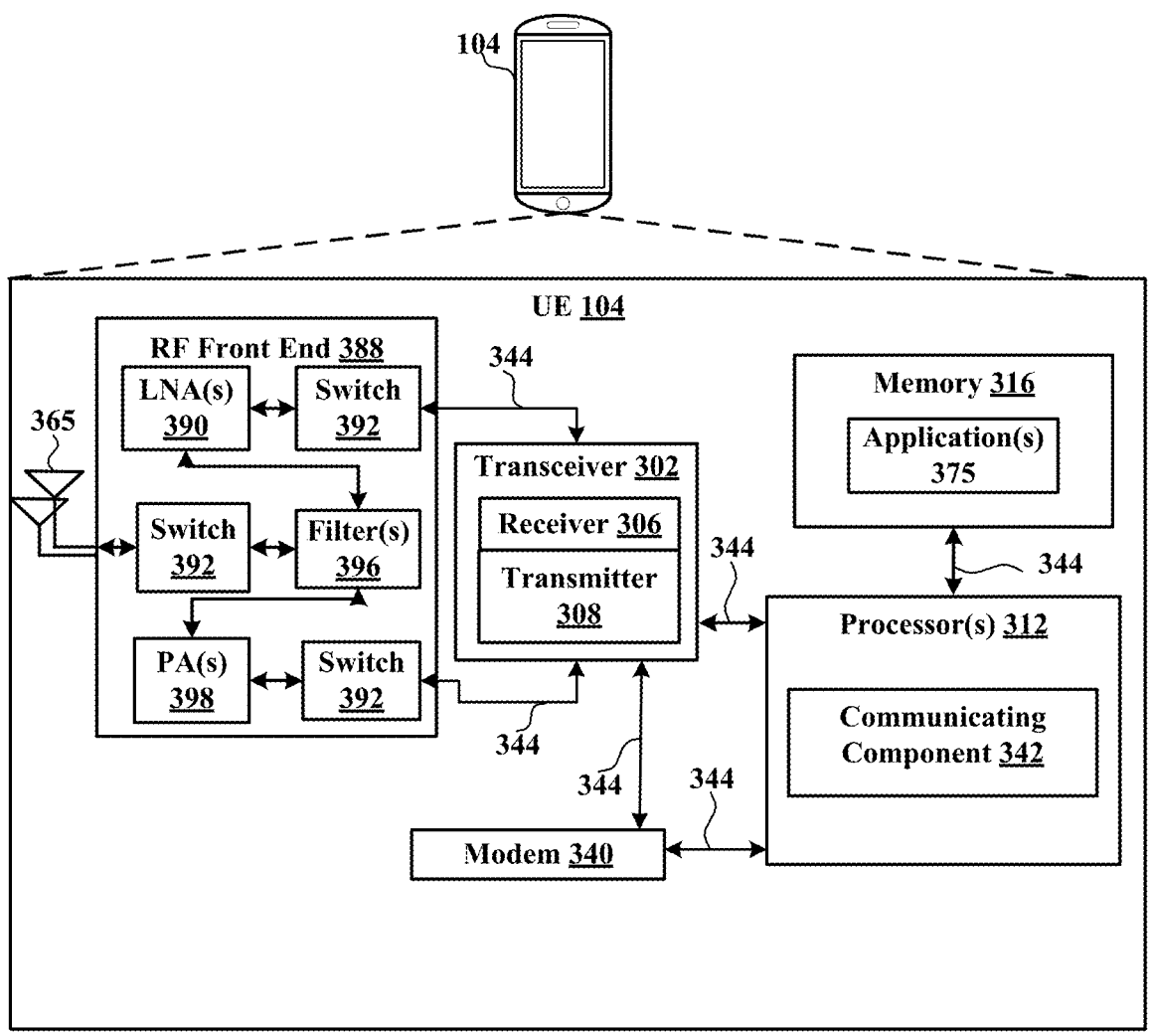
FIG. 3 is a block diagram illustrating an example of a user equipment (UE).

FIG. 3 is a block diagram illustrating an example of a UE 104. The UE 104 may include a variety of components, some of which have already been described above and are described further herein, including components such as one or more processors 312 and memory 316 and transceiver 302 in communication via one or more buses 344, which may operate in conjunction with modem 340 or communicating component 342 configured to indicate selection of a CSI report setting option (i.e., repetitious or non-repetitious CSI report transmission setting) by a distinct DMRS pattern.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

Figure 7:
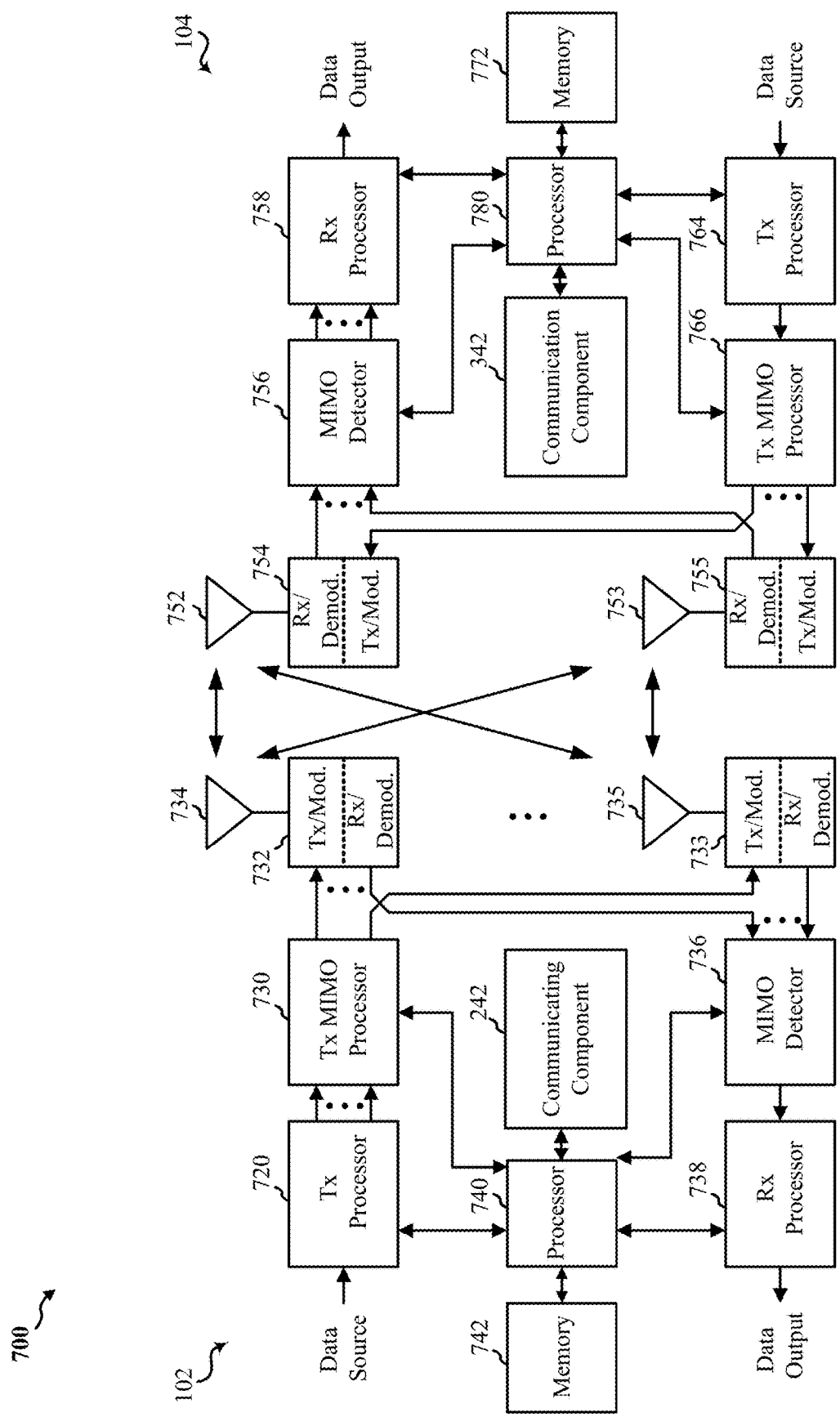
FIG. 7 is a block diagram illustrating an example of a MIMO communication system including a base station and a UE.

In some aspects, the processor(s) 312 may correspond to one or more of the processors described in connection with the base station in FIG. 7. Similarly, the memory 316 may correspond to the memory described in connection with the base station in FIG. 7.

FIG. 4 is an example representation of a CSI report 400. Specifically, reliability of a CSI report (i.e., Layer 1 reference signal received power (L1-RSRP) and Layer 1 signal-to-noise ratio (L1-SINR)) may be important for beam reliability for unicast coverage in frequency range 2 (FR2). For example, CSI in NR may include a channel quality indicator (CQI), precoding matrix indicator (PMI), CSI-RS resource indicator (CRI), strongest layer indication (SLI), rank indication (RI), L1-RSRP (i.e., for beam management), and/or L1-SINR (i.e., also for beam management). In some aspects, an L1-RSRP or L1-SINR report may be large (i.e., about 20 bits), which may result in poor coverage or transmission of the reports via a physical uplink control channel (PUCCH).

Different types of CSI reporting may include periodic, semi-persistent, and aperiodic. Periodic CSI reporting may be carried or transmitted on a short PUCCH or long PUCCH. Semi-persistent (SP) CSI reporting may be carried or transmitted on a long PUCCH or physical uplink shared channel (PUSCH). The resources and/or modulation and coding scheme (MCS) for SP-CSI on PUSCH may be allocated semi-persistently using downlink control information (DCI). Further, SP-CSI may support Type II CSI with minimum periodicity of 5 ms. Additionally, SP-CSI reporting may not be supported for aperiodic CSI-RS transmissions. In some aspects, one CSI report carried by or transmitted on multiple uplink reporting instances may not be precluded. Aperiodic CSI reporting may be carried or transmitted on a PUSCH multiplexed with or without uplink data. Periodic or SP-CSI reporting may support a number of periodicities (i.e., 5, 10, 20, 40, 80, 160, 320 slots).

In some aspects, L1-SINR may be used for beam selection by taking into account interference (e.g., with similar format as L1-RSRP). For example, up to four beams may be reported per configured report. An absolute SINR value may be reported for the first reported beam, which has a highest SINR. A differential SINR value may be reported per remaining beam (i.e., differential SINR may be computed with respect to the highest SINR). As shown, the CSI report 400 may include a CSI report number 402 and a number of CSI fields 404. The CSI fields 404 may include a CRI or synchronization signal block resource indicator (SSBRI), an SINR, and a differential SINR. However, transmissions of CSI reports may suffer from poor PUCCH transmissions when of a larger size. Further, the network may not be aware of a type of CSI reporting (e.g., periodic, semi-persistent, or aperiodic).

As such, to improve the reliability of beam management for unicast channels (i.e., PUCCH), an indication of a selection of a CSI report setting option by a DMRS pattern is disclosed herein.

Specifically, a selection of a CSI report by a UE may be indicated by a DMRS pattern. That is, two or more configured report settings e.g., with and without repetition, may be dynamically selected by a UE based on a number of measurements (e.g., RSRP or SINR), and indicated by a distinct DMRS pattern on a default (i.e., original) transmission of the CSI report (e.g., for blind detection by a gNB). The UE may determine whether coverage enhancement for configured CSI reporting is warranted by implementing a transmission periodicity for a CSI report and indicating such to the network entity as a DMRS pattern unique to the transmission periodicity (e.g., periodic or semi-persistent). That is, the coverage-enhanced CSI reporting may implement repetitious transmissions of a CSI report (e.g., as opposed to a default single CSI transmission). The specific repetitious transmissions, or reporting type, may be indicated using a DMRS pattern associated with the specific reporting type (e.g., periodic or semi-persistent). More specifically, the UE may select one set of parameters for the CSI report among two sets of parameters that may be already configured for the UE.

To aid the network, the UE may, as part of a first transmission of the CSI report, also transmit a distinct DMRS pattern associated with the determined periodic or semi-persistent transmission. For example, the UE may determine that due to channel conditions falling below a satisfactory threshold based on one or more measurements (e.g., SINR or RSRP), a periodic transmission of the CSI report may be warranted. To inform the network, the UE may transmit a first DMRS pattern associated with or otherwise indicating the periodic transmissions to the network entity. The network entity, having previously configured the UE for such DMRS pattern transmissions, and the specific DMRS pattern associations to the CSI reporting types (e.g., periodic or semi-persistent), may determine a type of CSI reporting in response to the receiving the DMRS pattern from the UE.

In some aspects, a configured gap may exist between the default transmission and an additional transmission as the network entity (e.g., gNB) may prepare a reservation of a spatial reception. Further, a set of multiple associated DMRS patterns for a CSI report and/or a correspondence of DMRS pattern to additional CSI report transmissions may be indicated in a configuration of a periodic CSI report or a semi-persistent CSI report. For a semi-persistent CSI report, correspondence of a DMRS pattern to an additional transmission of CSI report and/or the option of additional transmissions of CSI report (e.g., depending on DMRS pattern) may be determined by a the DCI that activates the CSI report. The criteria for selecting additional CSI report transmissions by UE may be configured by the network entity (e.g., gNB) in the CSI report setting configuration. For example, the criteria may include rules based on UE measurements (e.g. LLR quality, L1-RSRP or L1-SINR) or some statistics (e.g., means, median, or a function of previous measurement) based on UE measurements.

FIG. 5 is a flowchart of an example method 500 of wireless communication at an apparatus of a UE. In an example, a UE 104 can perform the functions described in method 500 using one or more of the components described in FIGS. 1, 3 and 7.

At block 502, the method 500 may obtain at least one measurement of a communication channel associated with a network entity. In some aspects, the communicating component 342, such as in conjunction with processor(s) 312, memory 316, or transceiver 302, may be configured to obtain at least one measurement of a communication channel associated with a network entity. Thus, the UE 104, the processor(s) 312, the communicating component 342 or one of its subcomponents may define the means for obtaining at least one measurement of a communication channel associated with a network entity. For example, the processor 312 of the UE 104 may activate the transceiver 302 and associated RF front end 388 components to obtain at least one measurement of a communication channel.

In some aspects, the at least one measurement corresponds to a downlink reception quality indicator, an RSRP, or an SINR.

At block 504, the method 500 may determine a CSI transmission setting based on the at least one measurement of the communication channel, the CSI transmission setting is associated with a distinct DMRS pattern. In some aspects, the communicating component 342, such as in conjunction with processor(s) 312, memory 316, or transceiver 302, may be configured to determine a CSI transmission setting based on the at least one measurement of the communication channel, the CSI transmission setting is associated with a distinct DMRS pattern. Thus, the UE 104, the processor(s) 312, the communicating component 342 or one of its subcomponents may define the means for determining a CSI transmission setting based on the at least one measurement of the communication channel, the CSI transmission setting is associated with a distinct DMRS pattern. For example, the processor 312 of the UE 104 may, in conjunction with one or more applications 375 residing at the memory 316, identify a CSI transmission setting based on the obtained measurement.

In some aspects, the CSI transmission setting may correspond to one of a repetitious CSI transmission setting or a non-repetitious CSI transmission setting.

In some aspects, the repetitious CSI transmission setting may correspond to a periodic CSI transmission and the non-repetitious CSI transmission setting corresponds to a semi-persistent CSI transmission.

In some aspects, the repetitious CSI transmission setting may be associated with a first DMRS pattern and the non-repetitious CSI transmission setting may be associated with a second DMRS pattern.

At block 506, the method 500 may transmit a CSI report with the distinct DMRS pattern to the network entity in accordance with the CSI transmission setting. In some aspects, the communicating component 342, such as in conjunction with processor(s) 312, memory 316, or transceiver 302, may be configured to transmit a CSI report with the distinct DMRS pattern to the network entity in accordance with the CSI transmission setting. Thus, the UE 104, the processor(s) 312, the communicating component 342 or one of its subcomponents may define the means for transmitting a CSI report with the distinct DMRS pattern to the network entity in accordance with the CSI transmission setting. For instance, to transmit the CSI report, the processor 312 of the UE 104 may activate the transceiver 302 and associated RF front end 388 components.

In some aspects, the method 500 may further include receiving DCI that activates the CSI report associated with the semi-persistent CSI transmission, and determining one or both of an option for a subsequent transmission of the CSI report or a correspondence of the distinct DMRS pattern to the subsequent transmission of the CSI report based on the DCI. In some aspects, the communicating component 342, such as in conjunction with processor(s) 312, memory 316, or transceiver 302, may be configured to receive DCI that activates the CSI report associated with the semi-persistent CSI transmission, and determine one or both of an option for a subsequent transmission of the CSI report or a correspondence of the distinct DMRS pattern to the subsequent transmission of the CSI report based on the DCI. Thus, the UE 104, the processor(s) 312, the communicating component 342 or one of its subcomponents may define the means for receiving DCI that activates the CSI report associated with the semi-persistent CSI transmission, and means for determining one or both of an option for a subsequent transmission of the CSI report or a correspondence of the distinct DMRS pattern to the subsequent transmission of the CSI report based on the DCI.

In some aspects, transmitting the distinct DMRS pattern may include transmitting the first DMRS pattern based on determining that the CSI transmission setting corresponds to the repetitious CSI transmission setting, and transmitting the second DMRS pattern based on determining that the CSI transmission setting corresponds to the non-repetitious CSI transmission setting.

In some aspects, the method 500 may further include determining that a non-transmission period has elapsed after transmitting the CSI report, the non-transmission period permits reservation of spatial resources for reception by the network entity, and transmitting a subsequent CSI report based on determining that the non-transmission period has elapsed. In some aspects, the communicating component 342, such as in conjunction with processor(s) 312, memory 316, or transceiver 302, may be configured to determine that a non-transmission period has elapsed after transmitting the CSI report, the non-transmission period permits reservation of spatial resources for reception by the network entity, and transmit a subsequent CSI report based on determining that the non-transmission period has elapsed. Thus, the UE 104, the processor(s) 312, the communicating component 342 or one of its subcomponents may define the means for determining that a non-transmission period has elapsed after transmitting the CSI report, the non-transmission period permits reservation of spatial resources for reception by the network entity, and means for transmitting a subsequent CSI report based on determining that the non-transmission period has elapsed.

In some aspects, the method 500 may further include receiving CSI report configuration information from the network entity including at least one of a set of multiple associated DMRS patterns for the CSI report, or a correspondence of the DMRS pattern to a subsequent CSI report transmission. In some aspects, the communicating component 342, such as in conjunction with processor(s) 312, memory 316, or transceiver 302, may be configured to receive CSI report configuration information from the network entity including at least one of a set of multiple associated DMRS patterns for the CSI report, or a correspondence of the DMRS pattern to a subsequent CSI report transmission. Thus, the UE 104, the processor(s) 312, the communicating component 342 or one of its subcomponents may define the means for receiving CSI report configuration information from the network entity including at least one of a set of multiple associated DMRS patterns for the CSI report, or a correspondence of the DMRS pattern to a subsequent CSI report transmission.

In some aspects, the method 500 may further include receiving CSI report setting configuration information including criteria for selecting the CSI transmission setting, the criteria includes at least one parameter corresponding to a channel measurement threshold that triggers selection of the distinct DMRS pattern.

FIG. 6 is a flowchart of an example method 600 of wireless communication at a network entity. In an example, a base station 102 can perform the functions described in method 600 using one or more of the components described in FIGS. 1, 2 and 7.

At block 602, the method 600 may transmit CSI setting configuration information to a UE, the CSI setting configuration information including at least one parameter corresponding to a channel measurement threshold that triggers selection of a distinct DMRS pattern based on a CSI transmission setting. In some aspects, the communicating component 242, such as in conjunction with processor(s) 212, memory 216, or transceiver 202, may be configured to transmit CSI setting configuration information to a UE, the CSI setting configuration information including at least one parameter corresponding to a channel measurement threshold that triggers selection of a distinct DMRS pattern based on a CSI transmission setting. Thus, the base station 102, the processor(s) 212, the communicating component 242 or one of its subcomponents may define the means for transmitting CSI setting configuration information to a UE, the CSI setting configuration information including at least one parameter corresponding to a channel measurement threshold that triggers selection of a distinct DMRS pattern based on a CSI transmission setting. For example, to transmit the CSI setting configuration information to the UE 104, the processor 212 of the base station 102 may activate the transceiver 202 and associated RF front end 288 components.

In some aspects, the CSI transmission setting may correspond to one of a repetitious CSI transmission setting or a non-repetitious CSI transmission setting.

In some aspects, the repetitious CSI transmission setting corresponds to a periodic CSI transmission and the non-repetitious CSI transmission setting corresponds to a semi-persistent CSI transmission.

In some aspects, the repetitious CSI transmission setting may be associated with a first DMRS pattern and the non-repetitious CSI transmission may be associated with a second DMRS pattern.

In some aspects, the CSI report configuration information may further include at least one of a set of multiple associated DMRS patterns for the CSI report, or a correspondence of the DMRS pattern to a subsequent CSI report transmission.

At block 604, the method 600 may receive a CSI report and the distinct DMRS pattern from the UE associated with the CSI transmission setting. In some aspects, the communicating component 242, such as in conjunction with processor(s) 212, memory 216, or transceiver 202, may be configured to receive a CSI report and the distinct DMRS pattern from the UE associated with the CSI transmission setting. Thus, the base station 102, the processor(s) 212, the communicating component 242 or one of its subcomponents may define the means for receiving a CSI report and the distinct DMRS pattern from the UE associated with the CSI transmission setting. For example, to receive the CSO report and DMRS pattern, the processor 212 of the base station 102 may activate the transceiver 202 and associated RF front end 288 components.

In some aspects, the method 500 may further include transmitting DCI that activates the CSI report associated with the semi-persistent CSI transmission. In some aspects, the communicating component 242, such as in conjunction with processor(s) 212, memory 216, or transceiver 202, may be configured to transmit DCI that activates the CSI report associated with the semi-persistent CSI transmission. Thus, the base station 102, the processor(s) 212, the communicating component 242 or one of its subcomponents may define the means for transmitting DCI that activates the CSI report associated with the semi-persistent CSI transmission.

In some aspects, the method 500 may further include determining whether the distinct DMRS pattern corresponds to the DMRS pattern or the second DMRS pattern, identifying the repetitious CSI transmission setting based on determining that the distinct DMRS pattern as the first DMRS pattern, and identifying the non-repetitious CSI transmission setting based on determining that the distinct DMRS pattern as the second DMRS pattern. In some aspects, the communicating component 242, such as in conjunction with processor(s) 212, memory 216, or transceiver 202, may be configured to determine whether the distinct DMRS pattern corresponds to the DMRS pattern or the second DMRS pattern, identify the repetitious CSI transmission setting based on determining that the distinct DMRS pattern as the first DMRS pattern, and identify the non-repetitious CSI transmission setting based on determining that the distinct DMRS pattern as the second DMRS pattern. Thus, the base station 102, the processor(s) 212, the communicating component 242 or one of its subcomponents may define the means for determining whether the distinct DMRS pattern corresponds to the DMRS pattern or the second DMRS pattern, means for identifying the repetitious CSI transmission setting based on determining that the distinct DMRS pattern as the first DMRS pattern, and means for identifying the non-repetitious CSI transmission setting based on determining that the distinct DMRS pattern as the second DMRS pattern FIG. 7 is a block diagram of a MIMO communication system 700 including a base station 102 and a UE 104. The MIMO communication system 700 may be configured to indicate selection of a CSI report setting option (i.e., repetitious or non-repetitious CSI report transmission setting) by a distinct DMRS pattern, as described herein. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 also may generate control symbols or reference symbols. A transmit MIMO processor 730 may perform spatial processing (such as precoding) on data symbols, control symbols, or reference symbols, if applicable, and may provide output symbol streams to the transmit modulator/demodulators 732 and 733. Each modulator/demodulator 732 through 733 may process a respective output symbol stream (such as for OFDM, etc.) to obtain an output sample stream. Each modulator/demodulator 732 through 733 may further process (such as convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (such as filter, amplify, downconvert, and digitize) a respective received signal to obtain input samples. Each modulator/demodulator 754 through 755 may further process the input samples (such as for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (such as demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see such as FIGS. 1 and 2).

On the uplink (UL), at the UE 104, a transmit processor 764 may receive and process data from a data source. The transmit processor 764 also may generate reference symbols for a reference signal. The symbols from the transmit processor 764 may be precoded by a transmit MIMO processor 766 if applicable, further processed by the modulator/demodulators 754 and 755 (such as for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

Some Additional Examples

The aspects described herein additionally include one or more of the following implementation examples described in the following numbered clauses.

1. A method of wireless communication at a user equipment (UE), comprising:
obtaining at least one measurement of a communication channel associated with a network entity;
determining a channel state information (CSI) transmission setting based on the at least one measurement of the communication channel, wherein the CSI transmission setting is associated with a distinct demodulation reference signal (DMRS) pattern; and
transmitting a CSI report with the distinct DMRS pattern to the network entity in accordance with the CSI transmission setting.

2. The method clause claim 1, wherein the CSI transmission setting corresponds to one of a repetitious CSI transmission setting or a non-repetitious CSI transmission setting.

3. The method of any preceding clause, wherein the repetitious CSI transmission setting corresponds to a periodic CSI transmission and the non-repetitious CSI transmission setting corresponds to a semi-persistent CSI transmission 4. The method of any preceding clause, further comprising:
receiving downlink control information (DCI) that activates the CSI report associated with the semi-persistent CSI transmission; and
determining one or both of an option for a subsequent transmission of the CSI report or a correspondence of the distinct DMRS pattern to the subsequent transmission of the CSI report based on the DCI.

5. The method of any preceding clause, wherein the repetitious CSI transmission setting is associated with a first DMRS pattern and the non-repetitious CSI transmission setting is associated with a second DMRS pattern, and wherein transmitting the distinct DMRS pattern includes:
transmitting the first DMRS pattern based on determining that the CSI transmission setting corresponds to the repetitious CSI transmission setting; and
transmitting the second DMRS pattern based on determining that the CSI transmission setting corresponds to the non-repetitious CSI transmission setting.

6. The method of any preceding clause, further comprising:
determining that a non-transmission period has elapsed after transmitting the CSI report, wherein the non-transmission period permits reservation of spatial resources for reception by the network entity; and
transmitting a subsequent CSI report based on determining that the non-transmission period has elapsed.

7. The method of any preceding clause, further comprising receiving CSI report configuration information from the network entity including at least one of:
a set of multiple associated DMRS patterns for the CSI report, or
a correspondence of the distinct DMRS pattern to a subsequent CSI report transmission.

8. The method of any preceding clause, further comprising receiving CSI report setting configuration information including criteria for selecting the CSI transmission setting, wherein the criteria includes at least one parameter corresponding to a channel measurement threshold that triggers selection of the distinct DMRS pattern.

9. The method of any preceding clause, wherein the at least one measurement corresponds to:
a downlink reception quality indicator,
a reference signal received power (RSRP), or
a signal-to-interference noise ratio (SINR).

10. A method of wireless communication at a network entity, comprising:
transmitting channel state information (CSI) setting configuration information to a user equipment (UE), the CSI setting configuration information including at least one parameter corresponding to a channel measurement threshold that triggers selection of a distinct demodulation reference signal (DMRS) pattern based on a CSI transmission setting; and
receiving a CSI report and the distinct DMRS pattern from the UE associated with the CSI transmission setting.

11. The method of any preceding clause, wherein the CSI transmission setting corresponds to one of a repetitious CSI transmission setting or a non-repetitious CSI transmission setting.

12. The method of any preceding clause, wherein the repetitious CSI transmission setting corresponds to a periodic CSI transmission and the non-repetitious CSI transmission setting corresponds to a semi-persistent CSI transmission.

13. The method of any preceding clause, further comprising transmitting downlink control information (DCI) that activates the CSI report associated with the semi-persistent CSI transmission.

14. The method of any preceding clause, wherein the repetitious CSI transmission setting is associated with a first DMRS pattern and the non-repetitious CSI transmission setting is associated with a second DMRS pattern, the method further comprising:
determining whether the distinct DMRS pattern corresponds to the DMRS pattern or the second DMRS pattern;
identifying the repetitious CSI transmission setting based on determining that the distinct DMRS pattern as the first DMRS pattern; and
identifying the non-repetitious CSI transmission setting based on determining that the distinct DMRS pattern as the second DMRS pattern.

15. The method of any preceding clause, wherein the CSI report configuration information further includes at least one of:
a set of multiple associated DMRS patterns for the CSI report, or
a correspondence of the distinct DMRS pattern to a subsequent CSI report transmission.

16. An apparatus for wireless communication, comprising:
a transceiver;
a memory configured to store instructions; and
at least one processor communicatively coupled with the transceiver and the memory, wherein the at least one processor is configured to:
obtain at least one measurement of a communication channel associated with a network entity;
determine a channel state information (CSI) transmission setting based on the at least one measurement of the communication channel, wherein the CSI transmission setting is associated with a distinct demodulation reference signal (DMRS) pattern; and
transmit a CSI report with the distinct DMRS pattern to the network entity in accordance with the CSI transmission setting.

17. The apparatus of clause 16, wherein the CSI transmission setting corresponds to one of a repetitious CSI transmission setting or a non-repetitious CSI transmission setting.

18. The apparatus of any preceding clause, wherein the repetitious CSI transmission setting corresponds to a periodic CSI transmission and the non-repetitious CSI transmission setting corresponds to a semi-persistent CSI transmission.

19. The apparatus of any preceding clause, wherein the at least one processor is further configured to:
receive downlink control information (DCI) that activates the CSI report associated with the semi-persistent CSI transmission; and
determine one or both of an option for a subsequent transmission of the CSI report or a correspondence of the distinct DMRS pattern to the subsequent transmission of the CSI report based on the DCI.

20. The apparatus of any preceding clause, wherein the repetitious CSI transmission setting is associated with a first DMRS pattern and the non-repetitious CSI transmission setting is associated with a second DMRS pattern, and wherein to transmit the distinct DMRS pattern, the at least one processor is further configured to:
transmit the first DMRS pattern based on determining that the CSI transmission setting corresponds to the repetitious CSI transmission setting; and
transmit the second DMRS pattern based on determining that the CSI transmission setting corresponds to the non-repetitious CSI transmission setting.

21. The apparatus of any preceding clause, wherein the at least one processor is further configured to:
determine that a non-transmission period has elapsed after transmitting the CSI report, wherein the non-transmission period permits reservation of spatial resources for reception by the network entity; and
transmit a subsequent CSI report based on determining that the non-transmission period has elapsed.

22. The apparatus of any preceding clause, wherein the at least one processor is further configured to receive CSI report configuration information from the network entity including at least one of:
a set of multiple associated DMRS patterns for the CSI report, or
a correspondence of the distinct DMRS pattern to a subsequent CSI report transmission.

23. The apparatus of any preceding clause, wherein the at least one processor is further configured to receive CSI report setting configuration information including criteria for selecting the CSI transmission setting, wherein the criteria includes at least one parameter corresponding to a channel measurement threshold that triggers selection of the distinct DMRS pattern.

24. The apparatus of any preceding clause, wherein the at least one measurement corresponds to:
a downlink reception quality indicator,
a reference signal received power (RSRP), or
a signal-to-interference noise ratio (SINR).

25. An apparatus for wireless communication, comprising:
a transceiver;
a memory configured to store instructions; and
at least one processor communicatively coupled with the transceiver and the memory, wherein the at least one processor is configured to:
transmitting channel state information (CSI) setting configuration information to a user equipment (UE), the CSI setting configuration information including at least one parameter corresponding to a channel measurement threshold that triggers selection of a distinct demodulation reference signal (DMRS) pattern based on a CSI transmission setting; and
receiving a CSI report and the distinct DMRS pattern from the UE associated with the CSI transmission setting.

26. The apparatus of clause 25, wherein the CSI transmission setting corresponds to one of a repetitious CSI transmission setting or a non-repetitious CSI transmission setting.

27. The apparatus of any preceding clause, wherein the repetitious CSI transmission setting corresponds to a periodic CSI transmission and the non-repetitious CSI transmission setting corresponds to a semi-persistent CSI transmission.

28. The apparatus of any preceding clause, wherein the at least one processor is further configured to transmit downlink control information (DCI) that activates the CSI report associated with the semi-persistent CSI transmission.

29. The apparatus of any preceding clause, wherein the repetitious CSI transmission setting is associated with a first DMRS pattern and the non-repetitious CSI transmission setting is associated with a second DMRS pattern, wherein the at least one processor is further configured to:
determine whether the distinct DMRS pattern corresponds to the DMRS pattern or the second DMRS pattern;
identify the repetitious CSI transmission setting based on determining that the distinct DMRS pattern as the first DMRS pattern; and
identify the non-repetitious CSI transmission setting based on determining that the distinct DMRS pattern as the second DMRS pattern.

30. The apparatus of any preceding clause, wherein the CSI report configuration information further includes at least one of:
a set of multiple associated DMRS patterns for the CSI report, or
a correspondence of the distinct DMRS pattern to a subsequent CSI report transmission.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single-or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication at a user equipment (UE), comprising:
   obtaining at least one measurement of a communication channel associated with a network entity;
   identifying a channel state information (CSI) transmission setting based on the at least one measurement of the communication channel, wherein the CSI transmission setting is associated with a distinct demodulation reference signal (DMRS) pattern;
   transmitting a CSI report with the distinct DMRS pattern to the network entity in accordance with the CSI transmission setting;
   identifying that a non-transmission period has elapsed after transmitting the CSI report, wherein the non-transmission period permits reservation of spatial resources for reception by the network entity; and
   transmitting a subsequent CSI report based on identifying that the non-transmission period has elapsed.

2. The method of claim 1, wherein the CSI transmission setting corresponds to one of a repetitious CSI transmission setting or a non-repetitious CSI transmission setting.

3. The method of claim 2, wherein the repetitious CSI transmission setting corresponds to a periodic CSI transmission and the non-repetitious CSI transmission setting corresponds to a semi-persistent CSI transmission.

4. The method of claim 3, further comprising:
   receiving downlink control information (DCI) that activates the CSI report associated with the semi-persistent CSI transmission; and
   identifying one or both of an option for a subsequent transmission of the CSI report or a correspondence of the distinct DMRS pattern to the subsequent transmission of the CSI report based on the DCI.

5. The method of claim 2, wherein the repetitious CSI transmission setting is associated with a first DMRS pattern and the non-repetitious CSI transmission setting is associated with a second DMRS pattern, and wherein transmitting the distinct DMRS pattern includes:
   transmitting the first DMRS pattern based on identifying that the CSI transmission setting corresponds to the repetitious CSI transmission setting; and
   transmitting the second DMRS pattern based on identifying that the CSI transmission setting corresponds to the non-repetitious CSI transmission setting.

6. The method of claim 1, further comprising receiving CSI report configuration information from the network entity including at least one of:
   a set of multiple associated DMRS patterns for the CSI report, or
   a correspondence of the distinct DMRS pattern to the subsequent CSI report.

7. The method of claim 1, further comprising receiving CSI report setting configuration information including criteria for selecting the CSI transmission setting, wherein the criteria includes at least one parameter corresponding to a channel measurement threshold that triggers selection of the distinct DMRS pattern.

8. The method of claim 1, wherein the at least one measurement corresponds to:
   a downlink reception quality indicator,
   a reference signal received power (RSRP), or
   a signal-to-interference noise ratio (SINR).

9. A method of wireless communication at a network entity, comprising:
   transmitting channel state information (CSI) setting configuration information to a user equipment (UE), the CSI setting configuration information including at least one parameter corresponding to a channel measurement threshold that triggers selection of a distinct demodulation reference signal (DMRS) pattern based on a CSI transmission setting;
   receiving a CSI report and the distinct DMRS pattern from the UE associated with the CSI transmission setting; and
   receiving a subsequent CSI report from the UE after a non-transmission period has elapsed associated with receiving the CSI report, the non-transmission period permits reservation of spatial resources for reception by the network entity.

10. The method of claim 9, wherein the CSI transmission setting corresponds to one of a repetitious CSI transmission setting or a non-repetitious CSI transmission setting.

11. The method of claim 10, wherein the repetitious CSI transmission setting corresponds to a periodic CSI transmission and the non-repetitious CSI transmission setting corresponds to a semi-persistent CSI transmission.

12. The method of claim 11, further comprising transmitting downlink control information (DCI) that activates the CSI report associated with the semi-persistent CSI transmission.

13. The method of claim 10, wherein the repetitious CSI transmission setting is associated with a first DMRS pattern and the non-repetitious CSI transmission setting is associated with a second DMRS pattern, the method further comprising:
   identifying whether the distinct DMRS pattern corresponds to the first DMRS pattern or the second DMRS pattern;
   identifying the repetitious CSI transmission setting based on identifying that the distinct DMRS pattern as the first DMRS pattern; and
   identifying the non-repetitious CSI transmission setting based on identifying that the distinct DMRS pattern as the second DMRS pattern.

14. The method of claim 9, wherein the CSI report configuration information further includes at least one of:
   a set of multiple associated DMRS patterns for the CSI report, or
   a correspondence of the distinct DMRS pattern to a subsequent CSI report transmission.

15. An apparatus for wireless communication, comprising:
   a transceiver;
   a memory configured to store instructions; and
   at least one processor communicatively coupled with the transceiver and the memory, wherein the at least one processor is configured to:
      obtain at least one measurement of a communication channel associated with a network entity;
      identify a channel state information (CSI) transmission setting based on the at least one measurement of the communication channel, wherein the CSI transmission setting is associated with a distinct demodulation reference signal (DMRS) pattern;
      transmit a CSI report with the distinct DMRS pattern to the network entity in accordance with the CSI transmission setting;
      identify that a non-transmission period has elapsed after transmitting the CSI report, wherein the non-transmission period permits reservation of spatial resources for reception by the network entity; and
      transmit a subsequent CSI report based on identifying that the non-transmission period has elapsed.

16. The apparatus of claim 15, wherein the CSI transmission setting corresponds to one of a repetitious CSI transmission setting or a non-repetitious CSI transmission setting.

17. The apparatus of claim 16, wherein the repetitious CSI transmission setting corresponds to a periodic CSI transmission and the non-repetitious CSI transmission setting corresponds to a semi-persistent CSI transmission.

18. The apparatus of claim 17, wherein the at least one processor is further configured to:
   receive downlink control information (DCI) that activates the CSI report associated with the semi-persistent CSI transmission; and
   identify one or both of an option for a subsequent transmission of the CSI report or a correspondence of the distinct DMRS pattern to the subsequent transmission of the CSI report based on the DCI.

19. The apparatus of claim 16, wherein the repetitious CSI transmission setting is associated with a first DMRS pattern and the non-repetitious CSI transmission setting is associated with a second DMRS pattern, and wherein to transmit the distinct DMRS pattern, the at least one processor is further configured to:
   transmit the first DMRS pattern based on identifying that the CSI transmission setting corresponds to the repetitious CSI transmission setting; and
   transmit the second DMRS pattern based on identifying that the CSI transmission setting corresponds to the non-repetitious CSI transmission setting.

20. The apparatus of claim 15, wherein the at least one processor is further configured to receive CSI report configuration information from the network entity including at least one of:
   a set of multiple associated DMRS patterns for the CSI report, or
   a correspondence of the distinct DMRS pattern to a subsequent CSI report transmission.

21. The apparatus of claim 15, wherein the at least one processor is further configured to receive CSI report setting configuration information including criteria for selecting the CSI transmission setting, wherein the criteria includes at least one parameter corresponding to a channel measurement threshold that triggers selection of the distinct DMRS pattern.

22. The apparatus of claim 15, wherein the at least one measurement corresponds to:
   a downlink reception quality indicator,
   a reference signal received power (RSRP), or
   a signal-to-interference noise ratio (SINR).

23. An apparatus for wireless communication, comprising:
   a transceiver;
   a memory configured to store instructions; and
   at least one processor communicatively coupled with the transceiver and the memory, wherein the at least one processor is configured to:
      transmit channel state information (CSI) setting configuration information to a user equipment (UE), the CSI setting configuration information including at least one parameter corresponding to a channel measurement threshold that triggers selection of a distinct demodulation reference signal (DMRS) pattern based on a CSI transmission setting;
      receive a CSI report and the distinct DMRS pattern from the UE associated with the CSI transmission setting; and
      receive a subsequent CSI report from the UE after a non-transmission period has elapsed associated with receiving the CSI report, the non-transmission period permits reservation of spatial resources for reception by the network entity.

24. The apparatus of claim 23, wherein the CSI transmission setting corresponds to one of a repetitious CSI transmission setting or a non-repetitious CSI transmission setting.

25. The apparatus of claim 24, wherein the repetitious CSI transmission setting corresponds to a periodic CSI transmission and the non-repetitious CSI transmission setting corresponds to a semi-persistent CSI transmission.

26. The apparatus of claim 25, wherein the at least one processor is further configured to transmit downlink control information (DCI) that activates the CSI report associated with the semi-persistent CSI transmission.

27. The apparatus of claim 24, wherein the repetitious CSI transmission setting is associated with a first DMRS pattern and the non-repetitious CSI transmission setting is associated with a second DMRS pattern, wherein the at least one processor is further configured to:
- identify whether the distinct DMRS pattern corresponds to the first DMRS pattern or the second DMRS pattern;
- identify the repetitious CSI transmission setting based on identifying that the distinct DMRS pattern as the first DMRS pattern; and
- identify the non-repetitious CSI transmission setting based on identifying that the distinct DMRS pattern as the second DMRS pattern.

28. The apparatus of claim 23, wherein the CSI report configuration information further includes at least one of:
- a set of multiple associated DMRS patterns for the CSI report, or
- a correspondence of the distinct DMRS pattern to a subsequent CSI report transmission.

* * * * *